United States Patent [19]
Mori et al.

[11] Patent Number: 5,359,441
[45] Date of Patent: Oct. 25, 1994

[54] REFLECTION TYPE LIQUID CRYSTAL DISPLAY APPARATUS HAVING A REFLECTIVE PIXEL ELECTRODE WITH AN ELONGATED WINDOW OVER A PHOTOCONDUCTIVE ELEMENT

[75] Inventors: Yuji Mori; Shinichi Komura, both of Hitachi, Japan

[73] Assignee: Hitachi, Ltd., Tokyo, Japan

[21] Appl. No.: 992,532

[22] Filed: Dec. 17, 1992

[30] Foreign Application Priority Data

Dec. 18, 1991 [JP] Japan .................. 3-334896
Jan. 20, 1992 [JP] Japan .................. 4-007669

[51] Int. Cl.$^5$ .............. G02F 1/13; G02F 1/1343; G02F 1/135
[52] U.S. Cl. .................. 359/51; 359/59; 359/72
[58] Field of Search ............ 359/51, 72, 40, 59

[56] References Cited

U.S. PATENT DOCUMENTS

| | | | |
|---|---|---|---|
| 4,239,346 | 12/1980 | Lloyd | 359/59 |
| 4,613,207 | 9/1986 | Fergason | 359/82 |
| 4,652,101 | 3/1987 | Grunwald | 359/70 |
| 4,818,074 | 4/1989 | Yokoi et al. | 359/40 |
| 4,917,474 | 4/1990 | Yamazaki et al. | 359/72 |
| 4,952,031 | 8/1990 | Tsunoda et al. | 359/72 |
| 4,999,619 | 3/1991 | Te Velde | 359/54 |
| 5,056,895 | 10/1991 | Kahn | 359/71 |
| 5,150,232 | 9/1992 | Gunkima et al. | 359/51 |
| 5,196,952 | 3/1993 | Hirai et al. | 359/51 |
| 5,206,673 | 4/1993 | Kawahara et al. | 359/63 |
| 5,216,531 | 6/1993 | Hirai et al. | 359/51 |

FOREIGN PATENT DOCUMENTS 2066545 7/1981 United Kingdom .............. 359/69

*Primary Examiner*—Anita P. Gross
*Attorney, Agent, or Firm*—Antonelli, Terry, Stout & Kraus

[57] ABSTRACT

A reflection type liquid crystal display apparatus is provided which is capable of displaying bright images by decreasing the loss of projected light. The reflection type liquid crystal display apparatus employs a polymer dispersed liquid crystal (PDLC) panel which assures a display mode (scattering or absorption mode) which does not employ a polarizing film, unlike a conventional liquid crystal panel. It has been found that such polarizing film reduce the efficiency with which the projected light is utilized. Since such a polarizing film is not used, and since the driving circuit portion which blocks the projected light and which serves as the non-opening portion can be utilized effectively for display, brightly displayed images can be obtained.

9 Claims, 13 Drawing Sheets

REFLECTION TYPE LIQUID CRYSTAL DISPLAY APPARATUS HAVING A REFLECTIVE PIXEL ELECTRODE WITH AN ELONGATED WINDOW OVER A PHOTOCONDUCTIVE ELEMENT

BACKGROUND OF THE INVENTION

1. Field of the Invention

The present invention relates to a liquid crystal display apparatus, and, more particularly, to a reflection type liquid crystal display apparatus which is capable of displaying a bright image by reducing a projected light loss.

2. Description of the Related Art

In a conventional reflection type liquid crystal display apparatus, for example, in a display apparatus which employs an STN liquid crystal, such as disclosed in Japanese Application No. Hei 2-111554, a polarizing film is provided on an optical path for display, and display is performed by utilizing changes in the rotated state of the plane of polarization of light, caused by the application of an electric field to the liquid crystal layer.

In the conventional reflection type liquid crystal display apparatus of the above-described type, at least 50% of the projected light is lost due to the provision of the polarizing film. Therefore, the display screen of the conventional reflection type liquid crystal display apparatus is not sufficiently bright, and there has been a demand for increasing the brightness of the display screen.

SUMMARY OF THE INVENTION

An object of the present invention is to provide a reflection type liquid crystal display apparatus which is capable of displaying a bright image by reducing the loss of projected light.

The above-described object can be achieved by the use of a polymer dispersed light liquid crystal (PDLC) panel in place of a conventionally used STN (super twisted nematic) type liquid crystal panel.

The PDLC panel offers a display mode (scattering or absorption mode) which requires no polarizing film, unlike the conventional liquid crystal panels, such as the STN liquid crystal panel, and is thus free from a projected light loss which would occur in the conventional apparatus due to the polarizing film, assuring a bright projected image.

DESCRIPTION OF THE PREFERRED EMBODIMENTS

Figure 1:
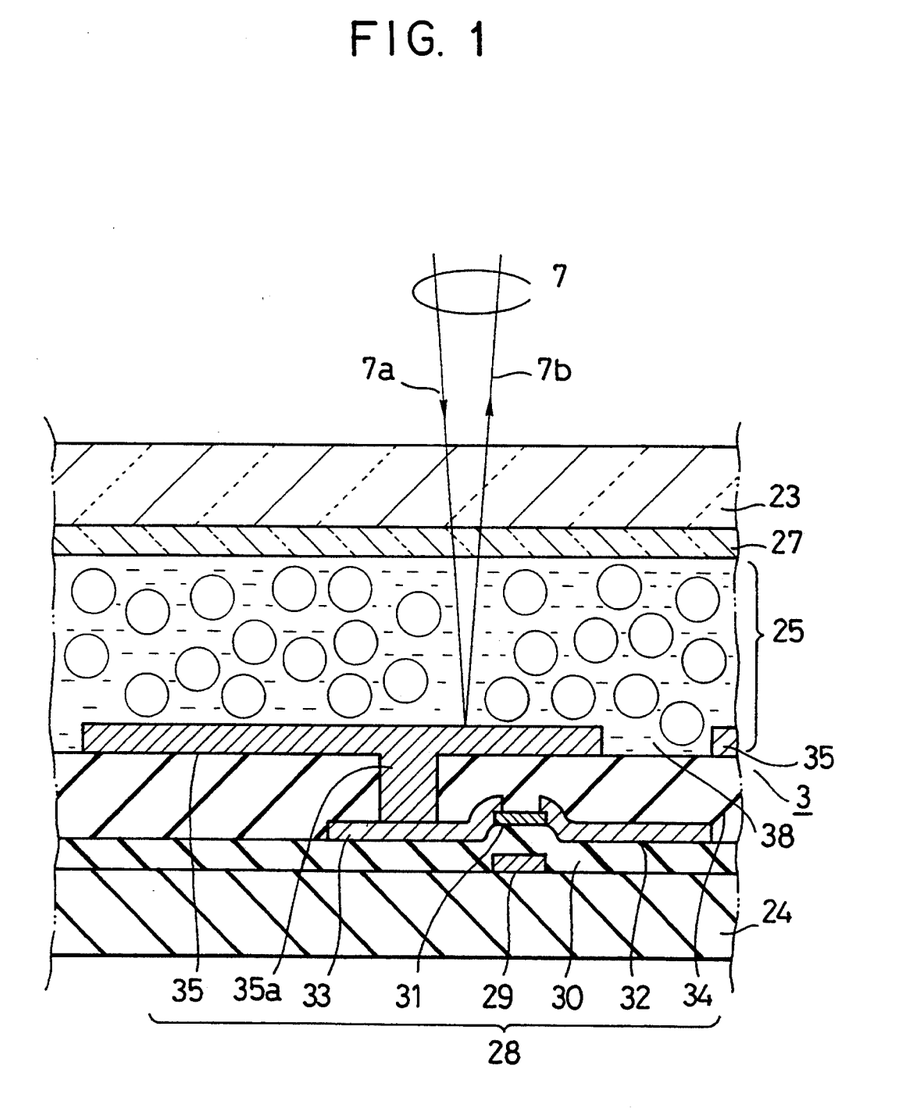
FIG. 1 shows the structure of a first embodiment of a reflection type liquid crystal display apparatus according to the present invention.
Figure 2:
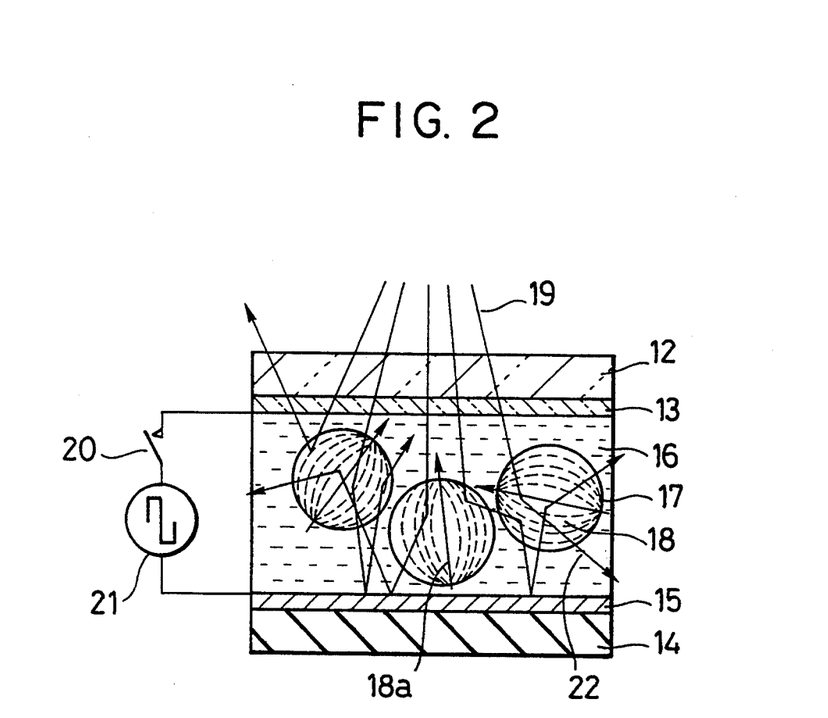
FIG. 2 illustrates the operation of the reflection type liquid crystal display apparatus which employs a PDLC when no voltage is applied thereto.
Figure 3:
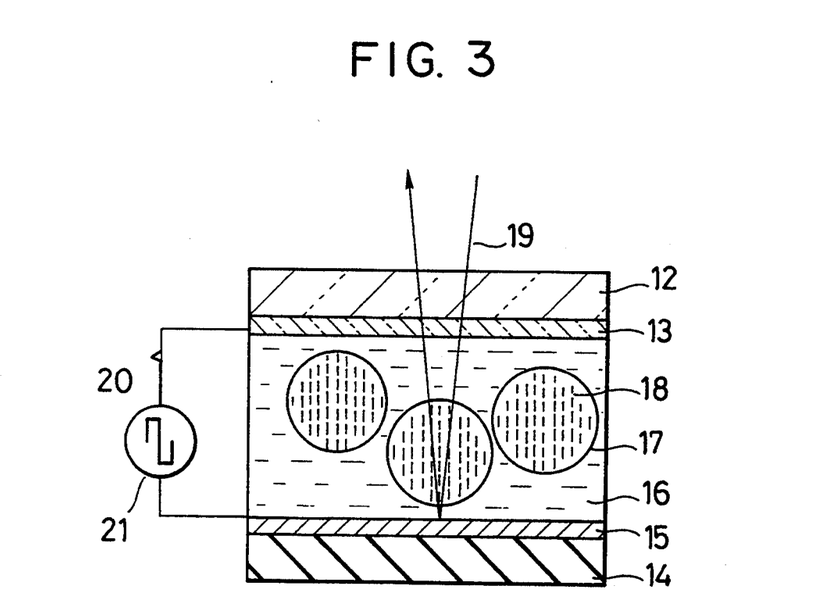
FIG. 3 illustrates the operation of the reflection type liquid crystal display apparatus which employs a PDLC when a voltage is applied thereto.

Embodiments of the present invention will be described below with reference to the accompanying drawings. FIG. 1 illustrates a first embodiment of a reflection type liquid crystal display apparatus according to the present invention. FIGS. 2 and 3 illustrate the operation of the reflection type liquid crystal display apparatus which employs a polymer dispersed type liquid crystal (PDLC).

Referring first to FIGS. 2 and 3, the display principle of the reflection type liquid crystal display apparatus which employs a PDLC will be described. In the liquid crystal display apparatus shown in FIGS. 2 and 3, a transparent substrate 12 and a substrate 14 are disposed in opposed relation, and a patterned transparent electrode 13 and a patterned reflection electrode 15 are respectively provided on the opposing surfaces of the substrates 12 and 14.

A polymer matrix 16 is gripped between the opposing substrates 12 and 14. Liquid crystal droplets 17 are dispersed in the polymer matrix 16. A power source 21 is connected between the transparent electrode 13 and the reflection electrode 15. The average diameter of the liquid crystal droplets 17 is between 1 and 2 $\mu$m, and the thickness of the polymer matrix 16 with the liquid crystal droplets contained therein is between 5 and 15 $\mu$m.

FIG. 2 shows the state of the liquid crystal droplets 17 which is obtained when a switch 20 for the power source 21 is turned off. A liquid crystal director 18a in the liquid crystal droplet 17 differs depending on an individual liquid crystal droplet 17. Accordingly, incident rays of light 19 which enter the liquid crystal display apparatus from the side of the substrate 12 are refracted by the surface of each of the liquid crystal droplets 17, and the direction of propagation of the light is bent randomly, generating scattering light 22. In that state, the liquid crystal display apparatus shows a scattering state.

When the switch 20 is turned on and a voltage is thereby applied from the power source 21 to the liquid crystal droplets/the polymer matrix layer via the transparent electrode 13 and the reflection electrode 15, as shown in FIG. 3, the liquid crystal director 18a in all the liquid crystal droplets 17 is changed to the direction of the electric field. At that time, the incident light 19 which enters the liquid crystal display apparatus reaches the reflection electrode 15 without being scattered, is reflected by the reflection electrode 15, passes through the liquid crystal droplets/the polymer matrix layer again and then the substrate 12, and leaves the display apparatus. In that state, the liquid crystal display apparatus shows a light reflecting state. A difference between the scattering state and the reflecting state is utilized in an original image plate of an overhead-projector or a projection type display apparatus, or in a display apparatus capable of direct display.

FIG. 1 is a cross-sectional view of a reflection type liquid crystal display apparatus which employs a TFT (Thin Film Transistor) structure to accomplish active matrix driving, illustrating one of the pixels thereof formed in a matrix. The liquid crystal display apparatus of FIG. 1 includes two substrates 23 and 24 which are disposed in opposed relation, and a polymer dispersed type liquid crystal (PDLC) layer 25 provided between the substrates 23 and 24. On the inner surface of the substrate 23 which opposes the other substrate 24, transparent electrodes 27 are provided parallel to each other in the row direction of the matrix. Gate interconnections 29 are disposed parallel to each other in the column direction of the matrix on the inner surface of the substrate 24. A plurality of TFTs 28 are disposed along each of the gate interconnections 29.

The substrate 23 is made of a transparent material so that it can transmit a projected light 7a therethrough. Examples of such transparent materials include glass, a synthetic resin, such as an acrylate resin or vinyl chloride resin, and a crystal of, for example, calcium fluoride. The substrate 24 can be made of the same material as that of the substrate 23. However, the substrate 24 can also be made of an opaque material, because transmission of light is not required. Examples of such opaque materials include a silicon substrate, and a fluorocarbon resin. The transparent electrodes 27 formed on the inner surface of the substrate 23 are made of a transparent conductive material, such as tin oxide or indium tin oxide (ITO).

A TFT 28 required for active matrix driving is formed on the substrate 24 in the manner described below: first, the gate interconnections 29 are formed on the substrate 24 parallel to each other in the column direction from aluminum, an alloy whose major component is aluminum, other metal material, an oxide metal material, such as tin oxide or indium tin oxide, or some other conductive material, such as polycrystalline silicon. Hereafter, one of the TFTs 28 disposed along the gate interconnection 29 will be described. First, an insulating film 30, which is a thin film of a dielectric substance, such as silicon nitride or a silicon oxide, is formed such that it covers the gate interconnection 29. Next, an amorphous silicon (a-Si) film 31 is patterned in an island form on the insulating film 30 above the gate interconnection 29. Subsequently, a drain electrode 32 and a source electrode 33 are formed on the insulating film 30 such that they overlap the a-Si film 31. Thereafter, an insulating film 34 is formed in such a manner that it covers the entire TFT 28, and then a reflection type pixel electrode 35 is formed on the insulating film 34. The insulating film 34 is made of silicon oxide, silicon nitride or titanium oxide. The pixel electrode 35 may be an aluminum, chromium or nickel film having a thickness of 100 nm or above, a high reflectance and a smooth surface or an interference reflection film in which dielectric substances are disposed one on top of another. The pixel electrode 35 and the source electrode 33 are connected to each other through a through-hole 35a formed in part of the insulating film 34. The projected light 7a passes through the substrate 23 and through the PDLC layer 25, and is then reflected by the pixel electrode 35.

Examples of the polymer matrixes used for the PDLC layer 25 include polyvinyl alcohol (PVA), an epoxy resin and an acrylate resin.

In this embodiment, since the polarizing film is not used so as to allow the projected light to be utilized effectively and since the pixel electrode serving as the reflection plate is provided on the TFT portion serving as a non-opening portion during display, in order to improve the aperture ratio, it is possible to obtain bright images.

The provision of a color filter in the liquid crystal panel enables a color display. Color display may also be achieved by providing a reflecting pixel electrode in which an interference filter made of a dielectric substance and a transparent conductive film made of, for example, indium oxide or indium tin oxide are laid on top of one another, because such a reflecting pixel electrode selects the wavelength when it reflects the projected light.

Although in the first embodiment, a scattering mode PDLC is used, a guest-host mode PDLC in which a black dichroic pigment is mixed into the liquid crystal droplet may also be used. In that case, brightness and darkness can be displayed on the display screen. Color display can be performed by coating a guest-host mode PDLC in which dichroic pigments of three primary colors of red, blue and green are mixed into the liquid crystal droplets on different pixels.

Figure 4:
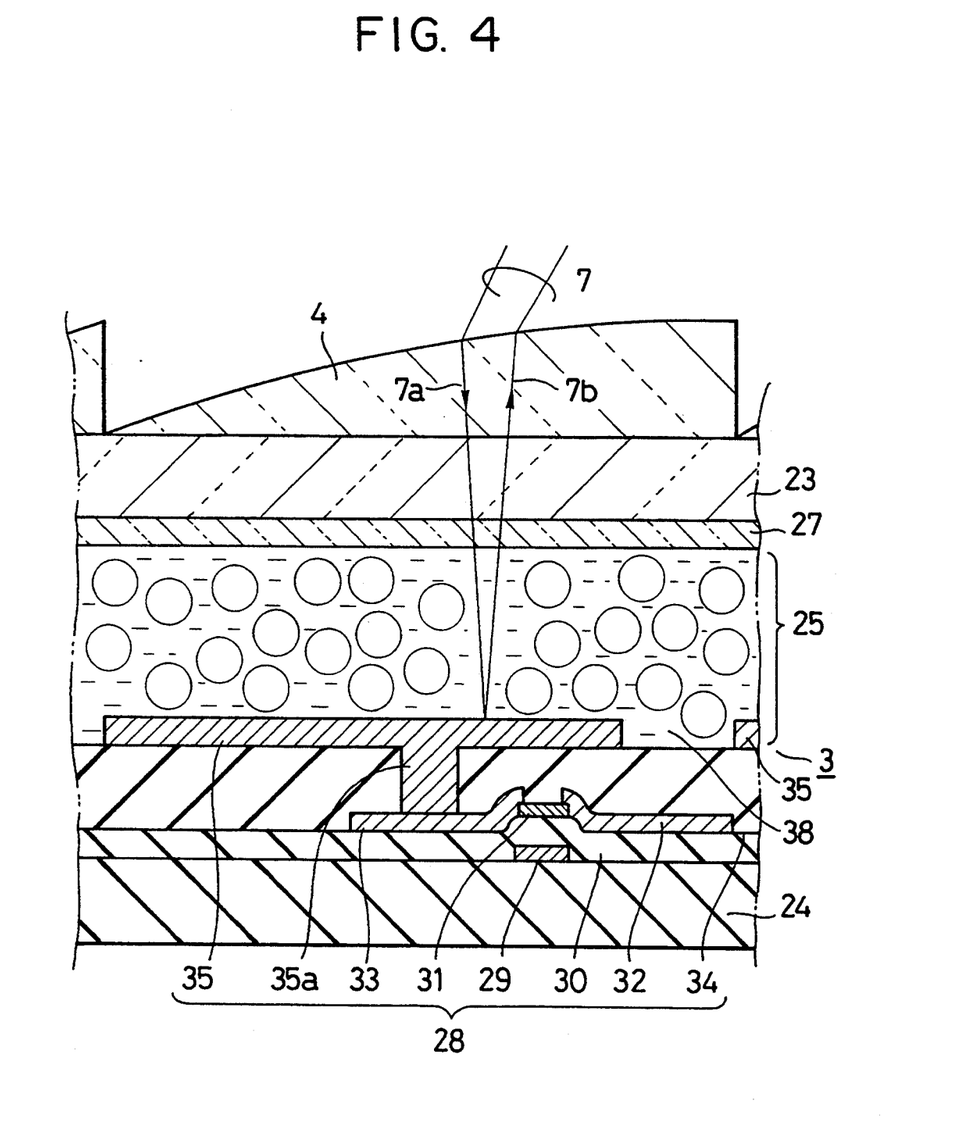
FIG. 4 shows the structure of a second embodiment of the reflection type liquid crystal display apparatus according to the present invention.
Figure 5:
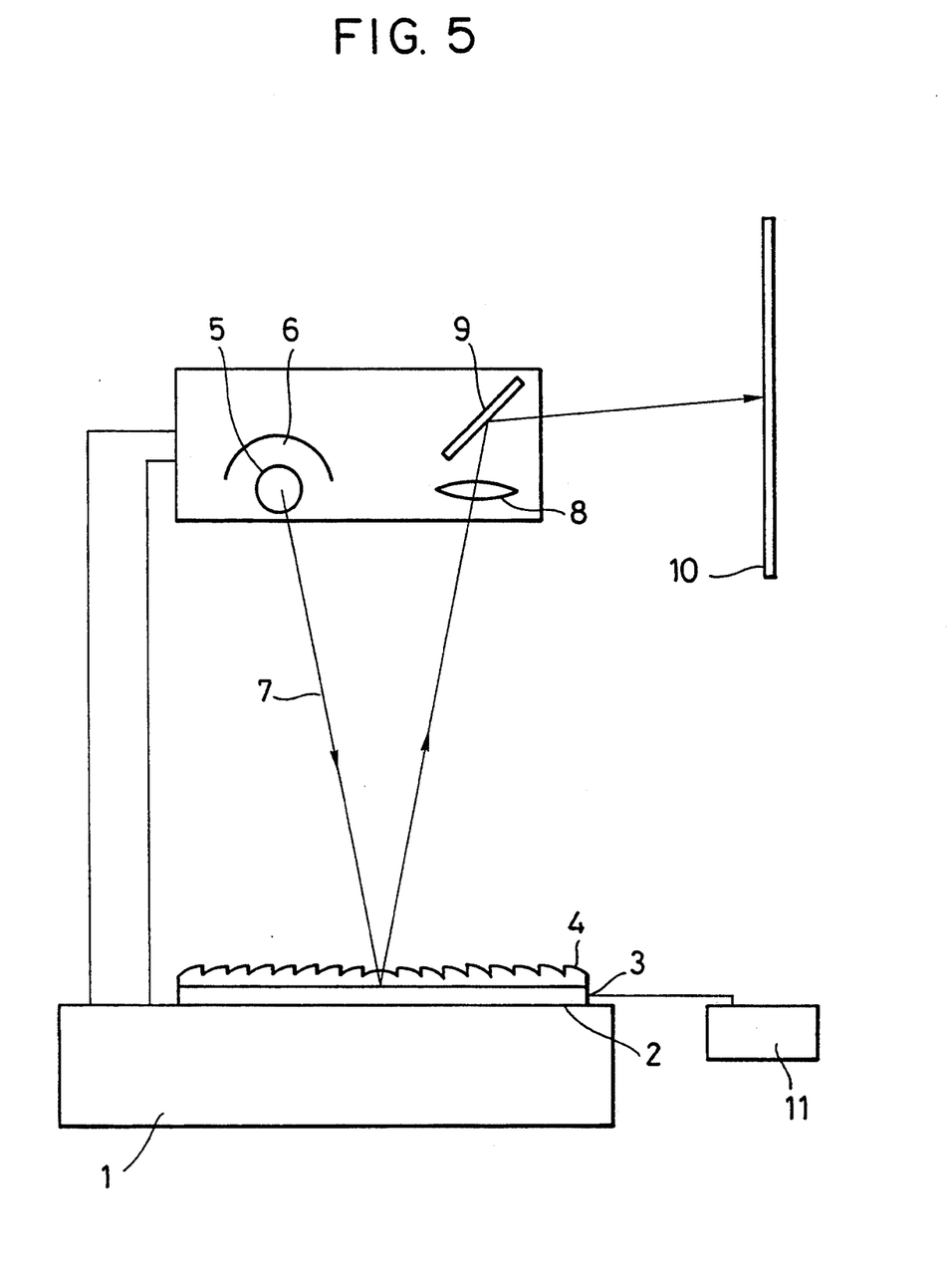
FIG. 5 shows the structure of a reflection type OHP which employs a third embodiment of the liquid crystal display apparatus according to the present invention.

FIG. 4 shows a second embodiment in which the reflection type liquid crystal display apparatus according to the first embodiment is applied to an original image plate for a reflection type overhead projector (hereinafter referred to as an OHP). FIG. 5 shows the structure of a reflection type OHP (a third embodiment) which employs the original image plate shown in FIG. 4.

In the reflection type OHP original image plate according to the present invention, a Fresnel lens plate 4 is provided on the substrate 23 of the reflection type liquid crystal display apparatus of FIG. 1, as shown in FIG. 4.

As shown in FIG. 5, a reflection type liquid crystal display apparatus 3 with the Fresnel lens plate 4 provided thereon is disposed on a table 2 of an OHP body 1. The OHP body 1 includes the table 2, a light source 5 provided above the table 2, a condenser lens 6 provided behind the light source 5 to condense the light of the light source 5 and project it to the reflection type liquid crystal display apparatus on the table 2 together with the light of the light source 5, a projection lens 5 for forming an image of the light reflected from the reflection type liquid crystal display apparatus, and a reflection plate 9 for reflecting an image formed by the projection lens 8 onto a screen 10.

Projected light 7 from the light source 5 and the condenser lens 6 illuminates the entire surface of the reflection type liquid crystal display apparatus 3 on the table 2 through the Fresnel lens plate 4. The projected light 7 which has illuminated the entire surface of the reflection type liquid crystal display apparatus 3 is reflected by the reflection type liquid crystal display apparatus 3, is condensed by the Fresnel lens plate 4 again, and is made incident on the projection lens 8. A desired image, formed on the reflection type liquid crystal display apparatus 3 by an image signal supplied from an external controller 11, is enlarged and projected onto the screen 10 by means of an optical system which starts with the light source 5 and ends with the reflection plate 9.

The operation of the reflection type OHP shown in FIG. 5 will be described below with reference to FIGS. 4 and 5. Project lighted 7a which has left the light source 5 and the condenser lens 6 and has been incident on the Fresnel lens plate 4 is refracted by the Fresnel lens plate 4, whereby he angle of incidence relative to the substrate 23 in the reflection type liquid crystal display apparatus 3 is reduced greatly. Consequently, the project lighted 7a is made incident on the PDLC layer 25 as substantially parallel rays of light.

Where no image signal voltage is applied, the projected light 7a incident on the PDLC layer 25 is scattered by the PDLC layer 25. The scattered projected light 7a is reflected by the pixel electrode 35. A reflected projected light 7b is further scattered by the PDLC layer 25. Thus, the projected light incident on the liquid crystal panel is scattered by the PDLC layer twice when it is incident thereon and when it is reflected therefrom, so that substantially no projected light reaches the projection lens. Therefore, a black display is provided on the screen.

When an image signal voltage is applied to the pixel electrode 35 through the TFT 28, the PDLC layer 25 shows a transparent state. At that time, the projected light 7a incident into the PDLC layer 25 is not scattered but reflected by the pixel electrode 35 in the state of parallel rays of light. The reflected projected light 7b passes through the PDLC layer 25, is refracted by the Fresnel lens plate 37, is imaged by the projection lens 8 and is then enlarged and projected onto the screen 10 by means of the reflection plate 9. In addition, no voltage is applied to a portion of the PDLC 25 which corresponds to a gap portion 38 between the adjoining pixel electrodes 35, and that portion of the PDLC layer 25 operates in a scattering state. Therefore, in an image displayed on the screen by means of the OHP, a portion thereof corresponding to the gap portion 38 is always blackened, and a display having black stripes and hence a high contrast can be obtained. Although the projected light incident on the reflection type liquid crystal display apparatus 3 illuminates the entire surface of the display apparatus 3, the angle of incidence of the projected light with respect to the reflection type liquid crystal display apparatus differs between the central portion thereof and a peripheral portion thereof. Hence, the Fresnel lens plate 4 designed with the difference in this angle of incidence taken into consideration is provided to make the projected light 7a in the reflection type liquid crystal display apparatus 3 substantially telecentric. Consequently, the scattering light in the PDLC mode in which display is performed utilizing the light scattering property can be removed, and only the parallel rays of light can be made incident on the projection lens 8, making the provision of an image of a high contrast possible.

When compared with the OHP which employs a TFT drive transmission type liquid crystal display apparatus, since the activated portion of the TFT is covered by the reflection type pixel electrode in the OHP which employs the reflection type liquid crystal display apparatus having the structure shown in FIG. 4 and employing the PDLC layer, a shielding structure normally required in the TFT liquid crystal display apparatus is not necessary. Furthermore, since the pixel electrode is extended above the TFT, the aperture ratio can be increased to a range between 80 and 90%, thus improving the efficiency with which the projected light is utilized, as compared with the transmission type liquid crystal display apparatus. Furthermore, since a polarizing film is not used in this embodiment which employs the reflection type liquid crystal display apparatus in order to allow the projected light to be utilized effectively, it is possible to obtain an image on a bright screen having a high contrast in comparison with the case which employs a conventional reflection type liquid crystal display apparatus employing an STN liquid crystal or a TFT drive transmission type liquid crystal display apparatus.

In this embodiment, although the Fresnel lens plate and the reflection type liquid crystal display apparatus are formed as one unit, they may be provided separately. In that case, the Fresnel lens plate can be moved in the direction of an optical axis of the projected light by using an adequate moving arrangement in order to correct a difference in the focal distance which occurs in a given OHP. As a result, the types of OHPs which can employ the reflection type liquid crystal display apparatus can be increased, thus increasing the type of OHP that can be used by the user.

A fourth embodiment of the present invention will be described below with reference to FIGS. 6 through 11. This embodiment relates to a simple matrix drive reflection type liquid crystal display apparatus which employs a PDLC.

Figure 6:
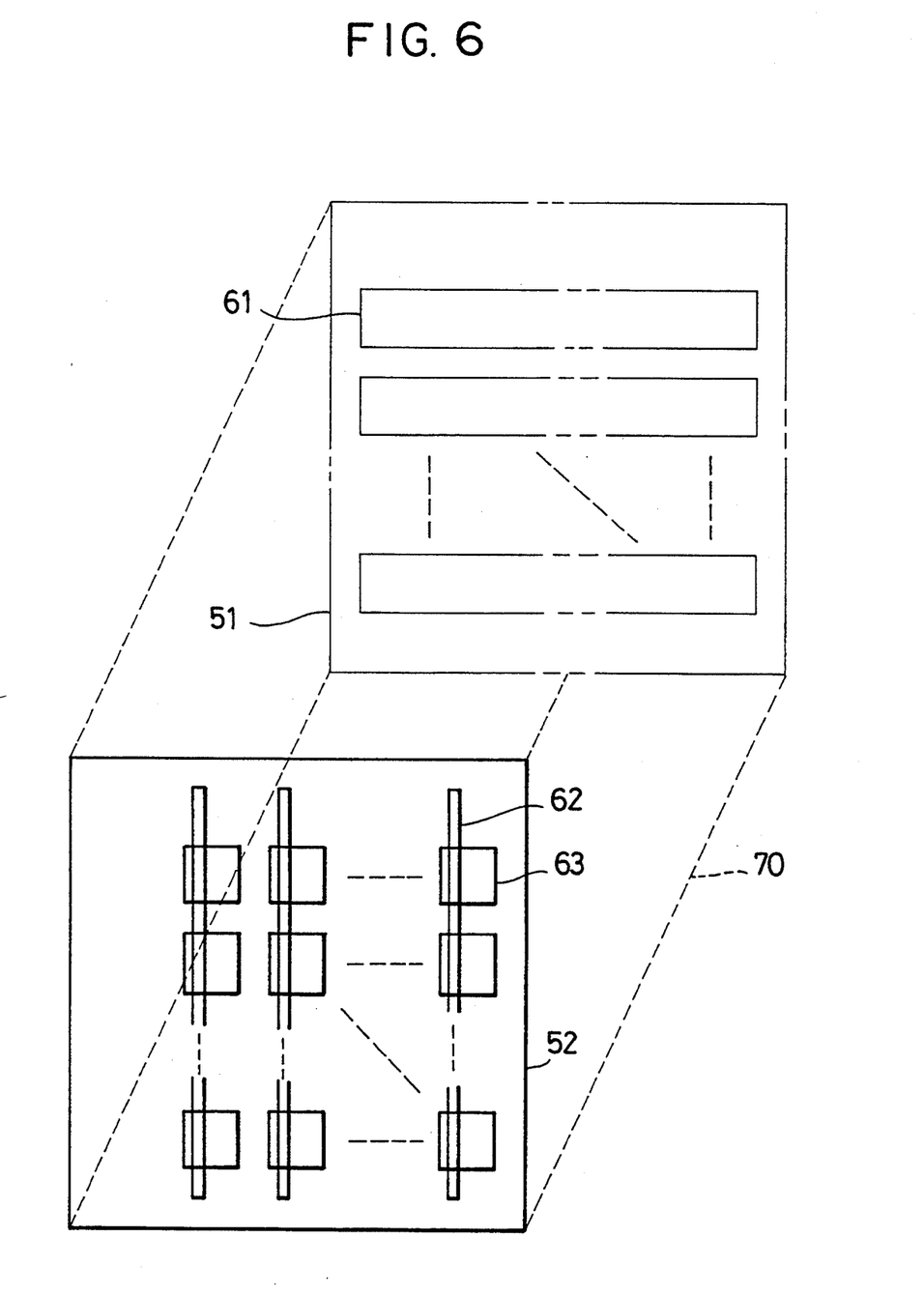
FIG. 6 is an exploded view of a fourth embodiment of the present invention.

Referring first to FIG. 6, a simple matrix drive reflection type liquid crystal display apparatus includes an upper substrate 51, a lower substrate 52 which opposes the upper substrate 51, and a PDLC 70 gripped between the substrates 51 and 52. A difference between the potential on a signal electrode 61 and a potential on a pixel electrode 63 is applied to the PDLC 70. The upper substrate 51 is transparent and has transparent belt-like signal electrodes 61 formed parallel to each other on the inner surface thereof which faces the liquid crystal. It is assumed that the direction in which the signal electrodes 61 extend is a row direction. The PDLC 70 provided between the substrates 51 and 52 is one in which liquid crystal droplets with a dichroic pigment mixed therein are dispersed in a polymer matrix and which is operated in the absorption mode. The lower substrate 52 has belt-like scanning electrodes 62 formed on the inner surface thereof which faces the liquid crystal. The scanning electrodes 62 run parallel to each other in a column direction perpendicular to the direction in which the signal electrodes are formed on the upper substrate 51. A plurality of pixel electrodes 63 are formed on each of the scanning electrodes 62 at fixed intervals. Thus, the pixel electrodes formed on the lower substrate 52 in the row direction constitute matrix-shaped pixels.

Figure 7:
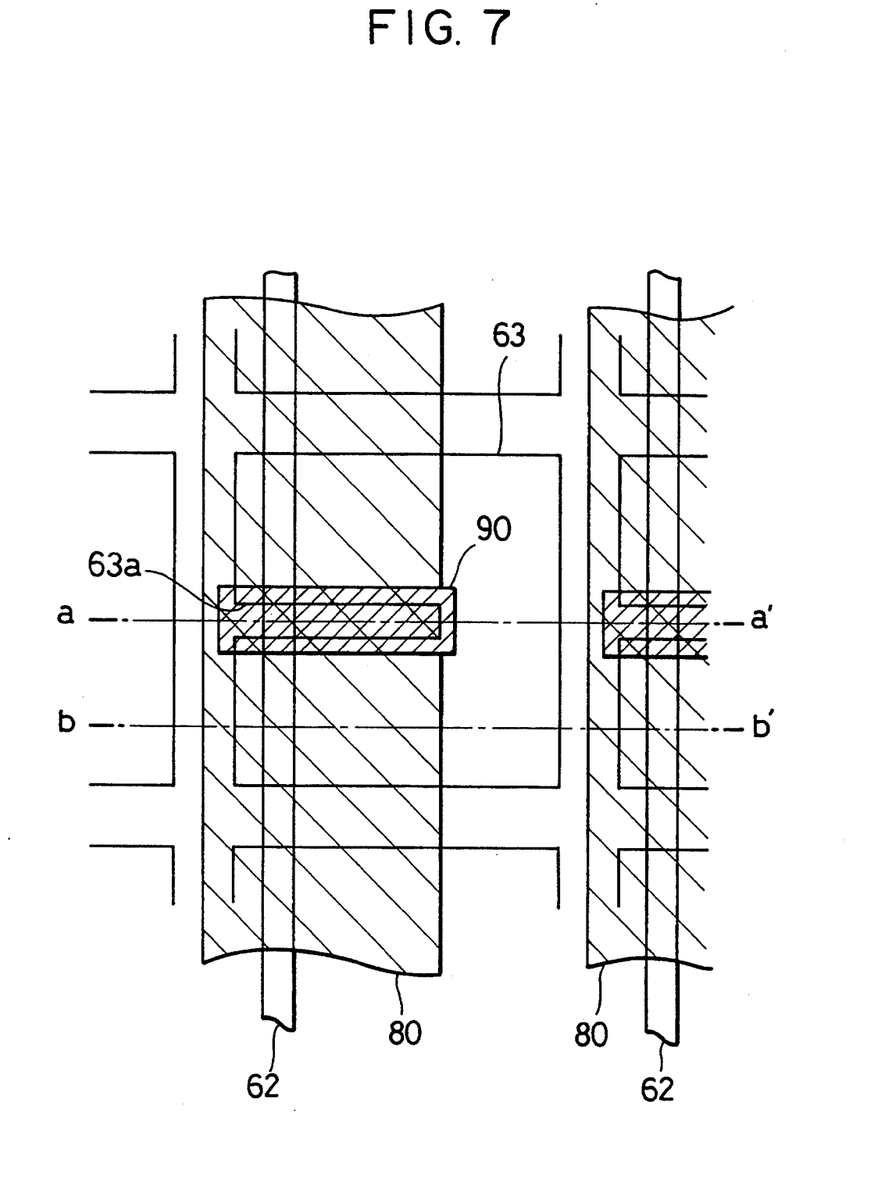
FIG. 7 is a plan view of a pixel portion of the fourth embodiment.
Figure 8:
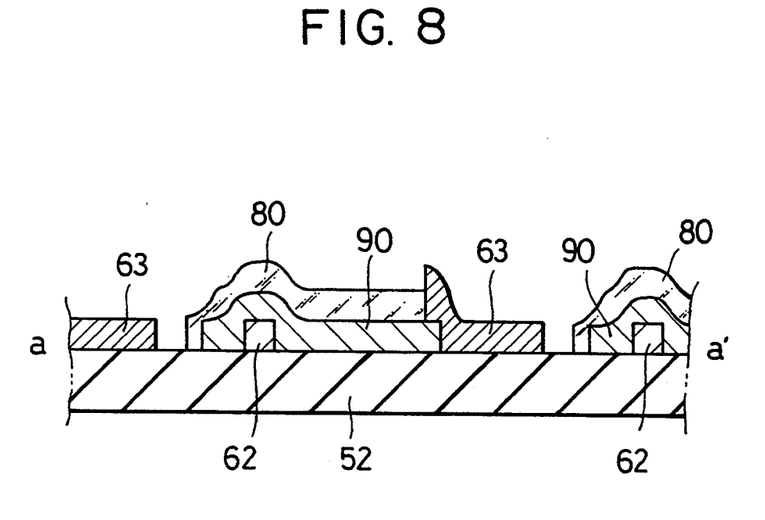
FIG. 8 is a section taken along the line a—a' of FIG. 7.
Figure 9:
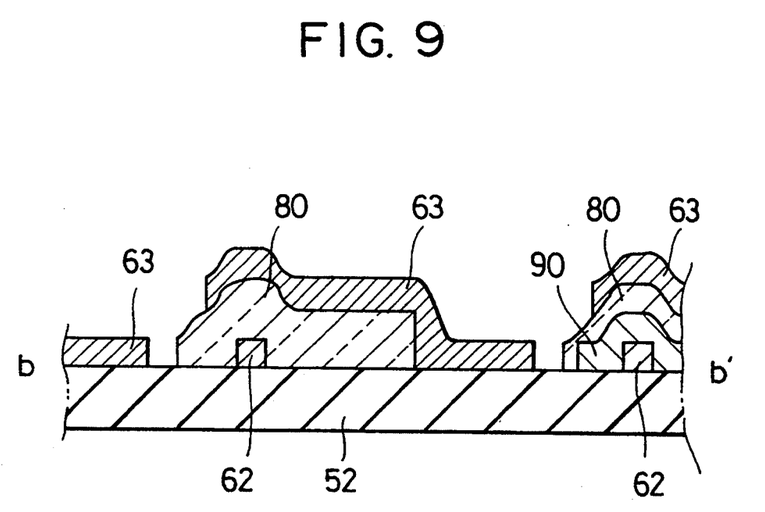
FIG. 9 is a section taken along the line b—b' of FIG. 7.

The pixel electrode 63 portion of the lower substrate 62 will be described in detail below. FIG. 7 is an enlarged view of the pixel electrode on the lower substrate. FIGS. 8 and 9 are respectively cross-sections taken along the lines a—a' and b—b' of FIG. 7. The pixel electrode 63 portion of the lower substrate 52 includes the scanning electrode 62 formed on the lower substrate 52 in the column direction, an elongated photo-conductive element 90 formed across the scanning electrode 62 and separated from an adjacent photo-conductive element 90 by a fixed interval, a transparent insulating film 80 extending in the column direction in such a manner that it covers the photo-conductive element 90 excluding one end portion thereof, and the pixel electrode 63 which defines a region in such a manner that it covers the one end portion of the photo-conductive element 90 and part of the insulating film 80 and which has a surface serving as the reflection surface. The pixel electrode 62 is connected to the scanning electrode 62 via the photoconductive element 90. An elongated window 63a is opened in the portion of the pixel electrode 63 which is located above the photo-conductive element 90.

The operation of the thus-arranged reflection type liquid crystal display apparatus will now be described. When light is illuminated from the outer surface side of the upper substrate 51, if the PDLC 70 is opaque, the PDLC 70 blocks the light, and no light is illuminated onto the photo-conductive element 90, increasing the resistance thereof. Consequently, a voltage applied between the scanning electrode 62 and the signal electrode 61 is applied to the photo-conductive element 90 having a high resistance, and not applied to the PDLC 70. As a result, no light is reflected by the reflection surface of the pixel electrode, and the pixel remains in a dark state.

If the PDLC 70 is transparent, the light is illuminated onto the photo-conductive element 90 through the elongated window 63a formed in the pixel electrode 63, reducing the resistance between the scanning electrode 62 and the pixel electrode 63. Consequently, most of the voltage applied between the scanning electrode 62 and the signal electrode 61 is applied to the PDLC 70. As a result, the light is reflected by the reflection surface of the pixel electrode 63, and the pixel shows a bright state. Since the photoconductive element 90 has a rectangular form, the capacitance thereof can be substantially ignored. Accordingly, even at a high-frequency, the voltage applied to the photo-conductive element 90 and the voltage applied to the PDLC 70 are determined by a resistive potential, and most of the voltage is thus applied to the PDLC 70.

When the voltage applied between the scanning electrode 62 corresponding to a given pixel and the signal electrode 61 is low, the PDLC 70 is opaque. Consequently, no light is illuminated onto the photo-conductive element 90 from the side of the upper substrate 51, and the photo-conductive element 90 thus has a high resistance. Therefore, even when the applied voltage is gradually increased, substantially no voltage is applied to the PDLC 70, and the pixel remains in a dark state.

When the voltage is further increased, the voltage applied to the PDLC 70 gradually increases, and thus light starts passing through the PDLC 70. As the PDLC 70 starts passing the light therethrough, the resistance between the pixel electrode 63 and the scanning electrode 62 decreases, thus increasing the voltage applied to the PDLC 70. This phenomenon occurs in a positive feedback fashion, and the displayed state of the pixel brightens rapidly.

In contrast, when the voltage applied between the scanning electrode 62 and the signal electrode 61 is gradually reduced, the resistance between the scanning electrode 62 and the pixel electrode 63 remains low, and most of the voltage is applied to the PDLC 70, leaving the pixel in a bright state. Thereafter, the displayed state of the pixel rapidly darkens.

Figure 10:
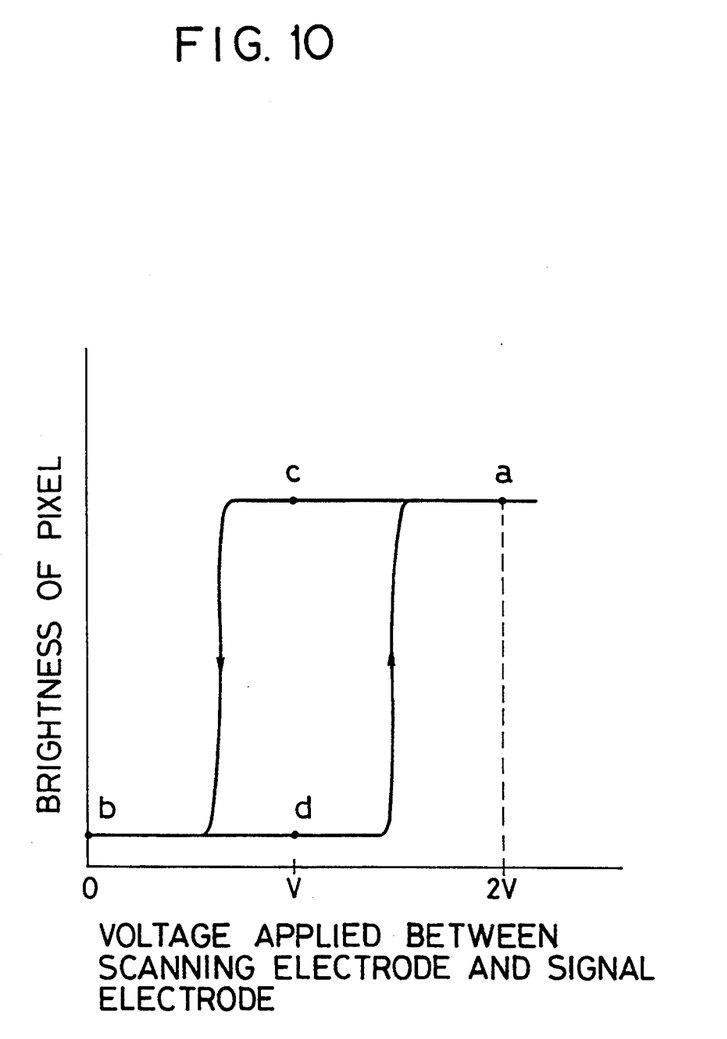
FIG. 10 shows the relation between the voltage applied to the liquid crystal and the brightness of the pixel in the fourth embodiment.

FIG. 10 shows the relation between the voltage applied between the scanning electrode 62 and the signal electrode 61 and the brightness of the pixel. The brightness of the pixel is characterized by its rapid threshold characteristics, and shows hysteresis between the voltage increasing period and the voltage decreasing period.

Thus, during selection, 2 volts are applied between the scanning electrode 62 and the signal electrode 61 of the display portion where the pixel thereof is functioning while zero voltage is applied to the non-displaying portion where the pixel thereof is not functioning so as to make the displaying portion show a bright state of a point 'a' and to make the non-displaying portion show a dark state of a point 'b'. During non-selection, 1 volt is applied to each of the displaying portion and the non-displaying portion so as to maintain the displaying portion in a bright state of a point 'c' and the non-displaying portion in a dark state of a point 'd', i.e., to maintain the brightness or darkness obtained during selection.

Figure 11:
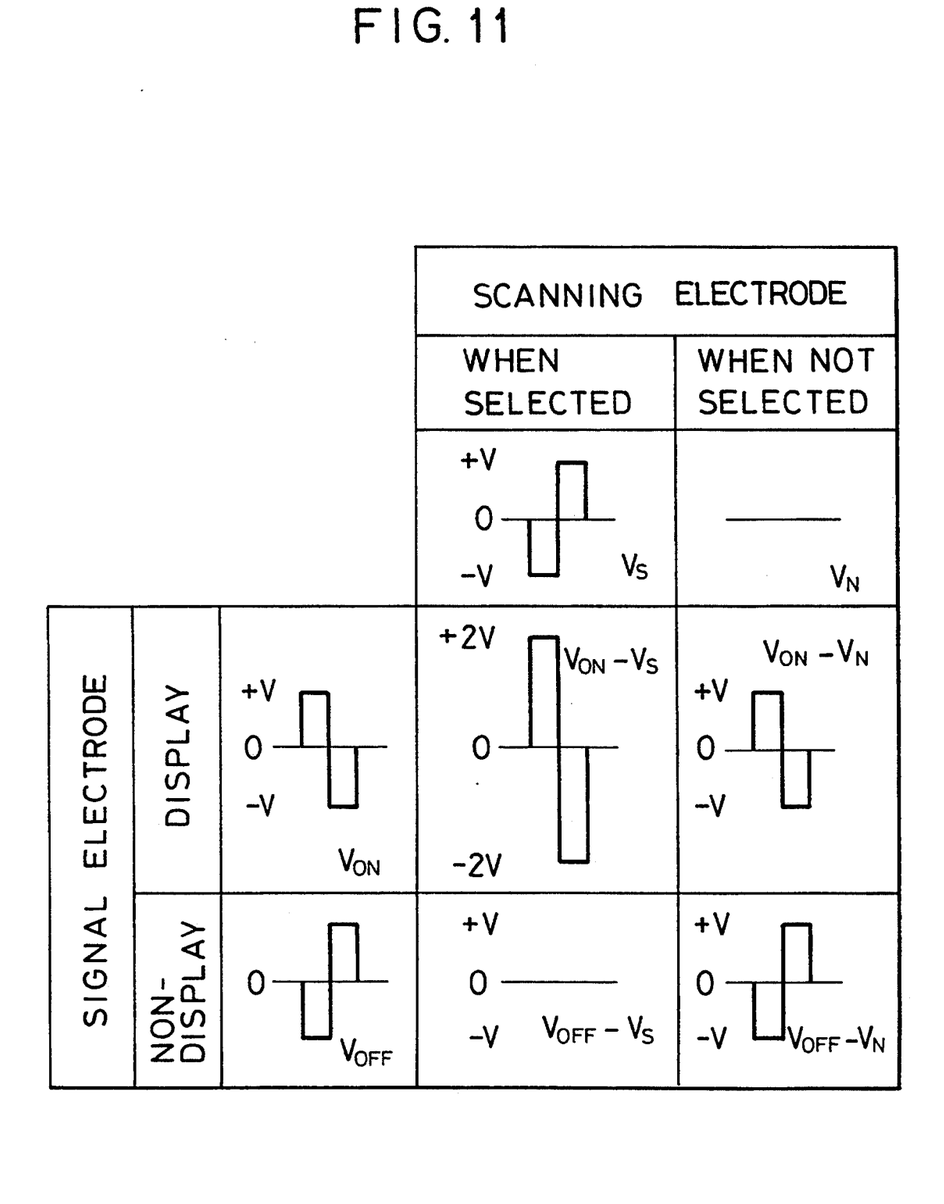
FIG. 11 shows the driving voltages in the fourth embodiment.

FIG. 11 shows an example of a method of applying such voltages. The scanning electrodes 62 disposed parallel to each other in the column direction are selected in sequence. During selection, rectangular pulses of $\pm V$ are applied to the scanning electrode 62. During non-selection, zero voltage is applied to the scanning electrode 62. Rectangular pulses of $\pm V$ are applied to the signal electrodes 61 disposed parallel to each other in the row direction during display. During non-display, rectangular pulses which is 180° out of phase with the rectangular pulses applied during display are applied to the signal electrodes 61. Thus, four types of voltages generated by combining those voltages are applied to the PDLC 70 of the pixel portion.

When display of the pixel is performed, a voltage which is 180° out of phase with that applied to the selected scanning electrode 62 is applied while the scanning electrode 62 corresponding to that pixel is selected so as to make the voltage applied to the PDLC 70 $\pm 2$ volts. When non-display is performed on the pixel, a voltage which is in phase with that applied to the scanning electrode 62 is applied so as to make the voltage applied to the PDLC 70 zero. During non-selection, a voltage of $\pm V$ is applied to the PDLC 70 regardless of the voltage of the signal electrode 21 so as to maintain the display obtained during selection.

Thus, in this embodiment, since the elongated window 63a through which the light passes to the pixel electrode 63 is provided and since the elongated photo-conductive element 90 is formed below the elongated window 63a, when a voltage is applied between the signal electrode 61 and the scanning electrode 62 through the photo-conductive element 90 and the light thereby passes to the PDLC 70, the resistance of the photo-conductive element 90 decreases, rapidly increasing the voltage applied to the PDLC 70 due to the positive feedback operation. Thus, the brightness to be displayed by the pixel has rapid threshold characteristics. In addition, since a high time sharing drive is employed and since the polarizing plate is not used in order to eliminate reduction in the efficiency with which the display apparatus is used, it is possible to provide a liquid crystal display apparatus capable of bright display.

Figure 13:
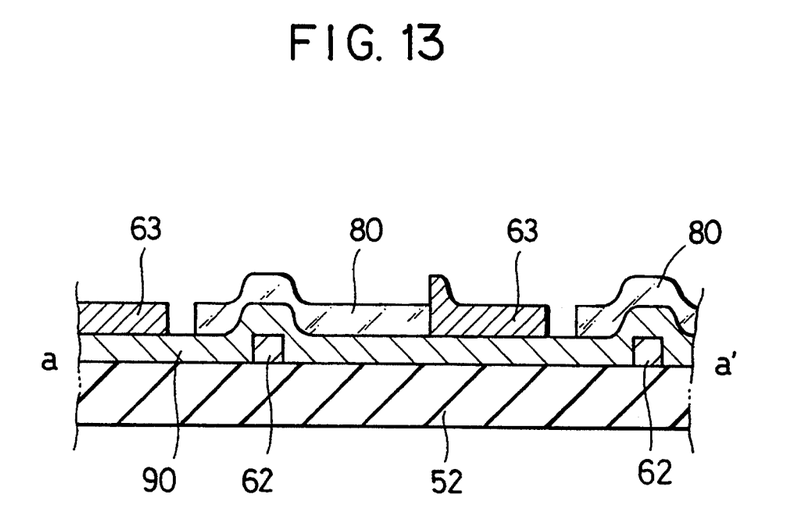
FIG. 13 is a section taken along the line a—a' of FIG. 12.
Figure 14:
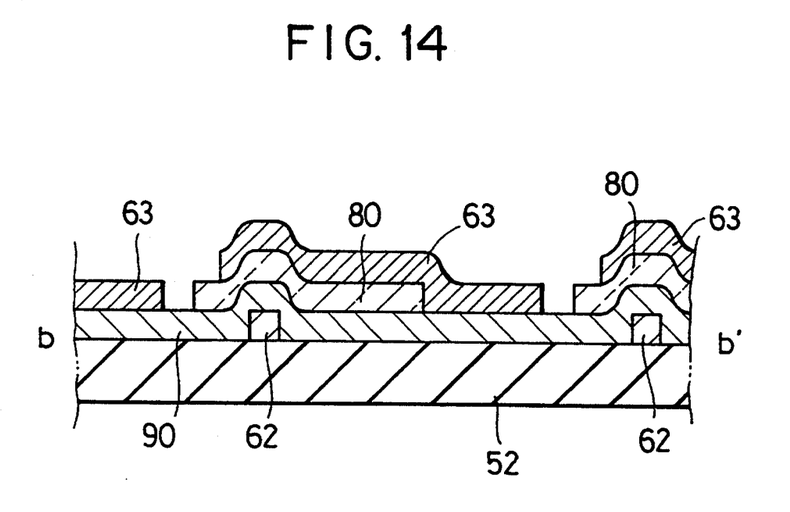
FIG. 14 is a section taken along the line b—b' of FIG. 12.

A fifth embodiment of the present invention will be described below. This embodiment differs from the fourth embodiment in the structure formed on the lower substrate 62, as shown in FIGS. 12, 13 and 14.

Figure 12:
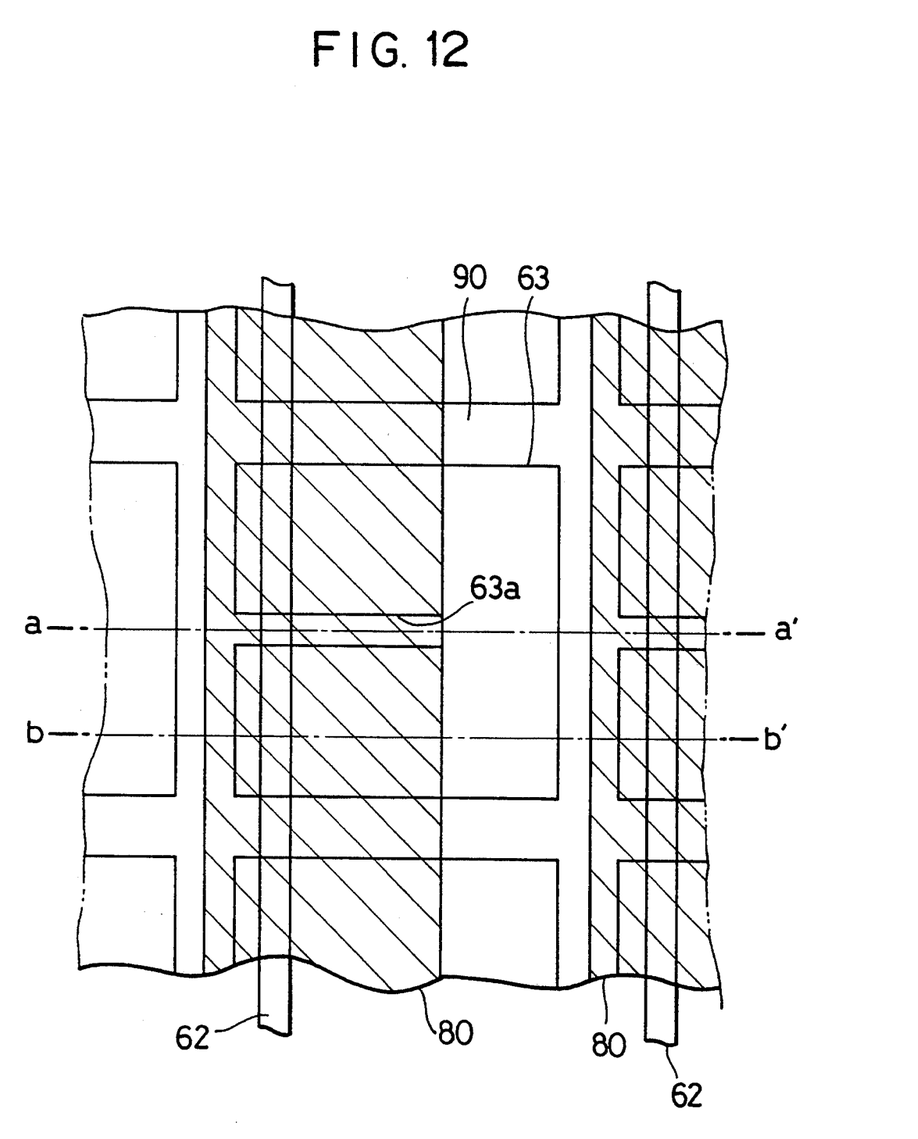
FIG. 12 is a plan view of the pixel portion of a fifth embodiment according to the present invention.

FIG. 12 is an enlarged view of the pixel portion of the lower substrate 52 of the fifth embodiment. FIGS. 13 and 14 are respectively cross-sections taken along the lines a—a' and b—b' of FIG. 12. Identical reference numerals in these figures to those of the fourth embodiment represent similar or identical elements. In this embodiment, the photoconductive element 90 is formed on the entire surface of the lower substrate 52, unlike the fourth embodiment. The scanning electrode 62, the insulating film 80 and the pixel element 63 are formed on the lower substrate 52 in the same manner as that of the fourth embodiment. In the reflection type liquid crystal display apparatus according to the fifth embodiment, since light is illuminated onto the photoconductive element 90 from the side of the upper substrate 51 through the elongated window 63a opened in the pixel electrode 63, the resistance of the photo-conductive element decreases and the voltage applied to the PDLC thus rapidly increases, as in the case of the fourth embodiment. Consequently, the brightness displayed by the pixel has rapid threshold characteristics. It is thus possible to provide a reflection type liquid crystal display apparatus which is capable of high time sharing drive and bright display.

Figure 15:
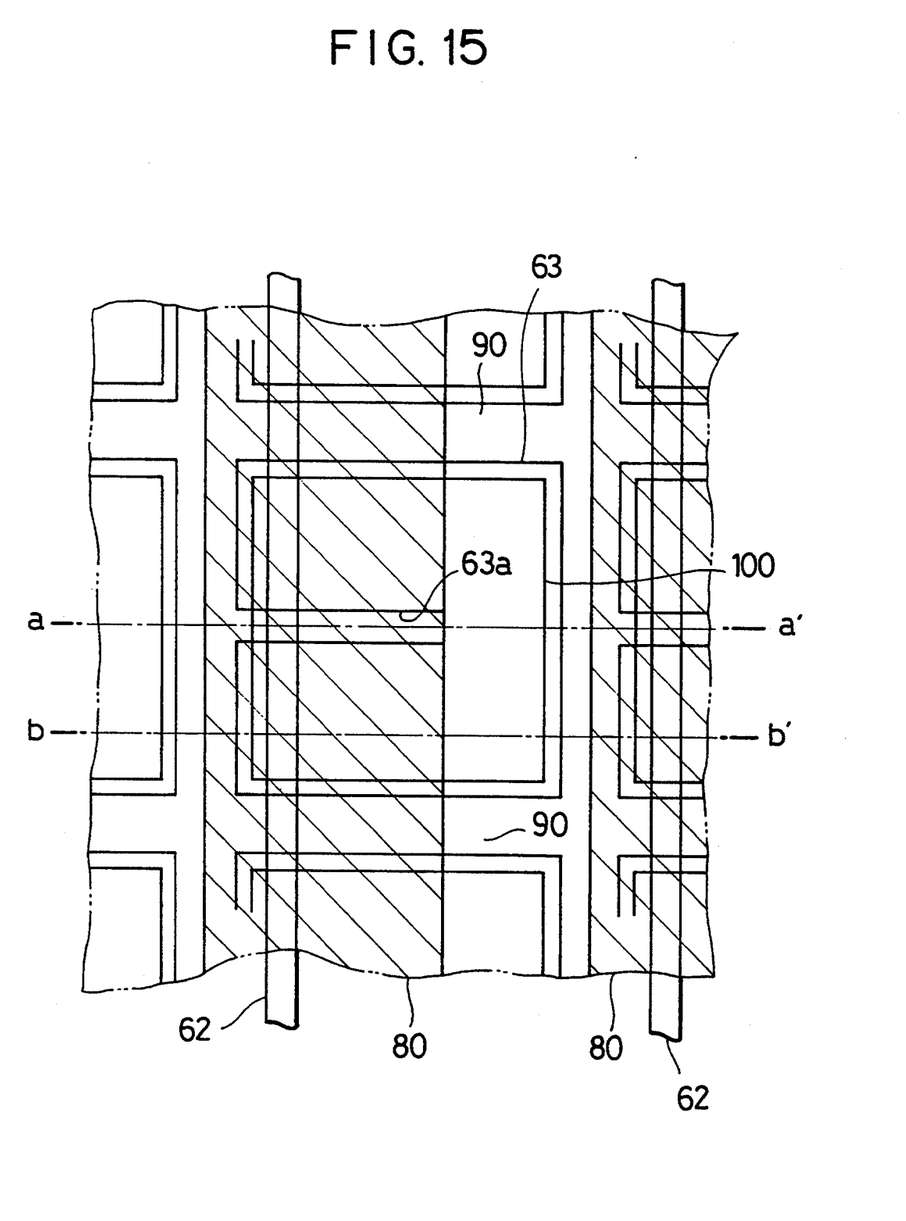
FIG. 15 is a plan view of the pixel portion of a sixth embodiment of the present invention.
Figure 16:
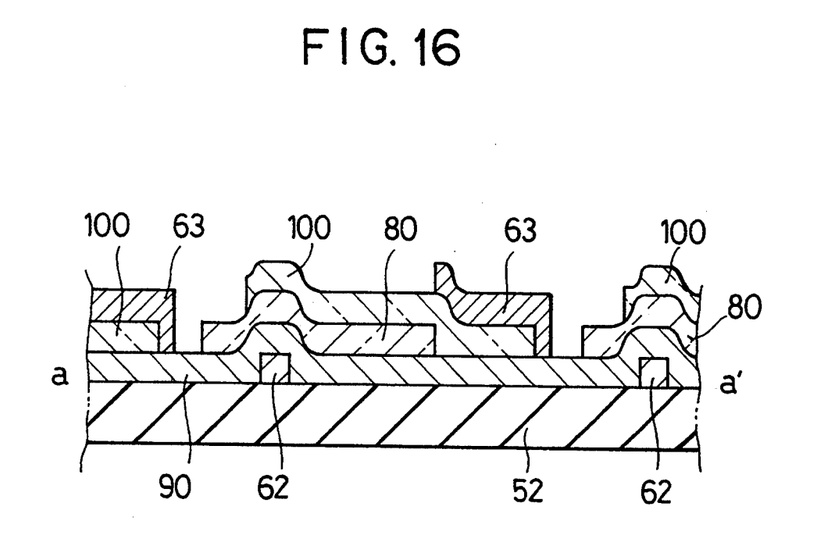
FIG. 16 is a section taken along the line a—a' of FIG. 15.
Figure 17:
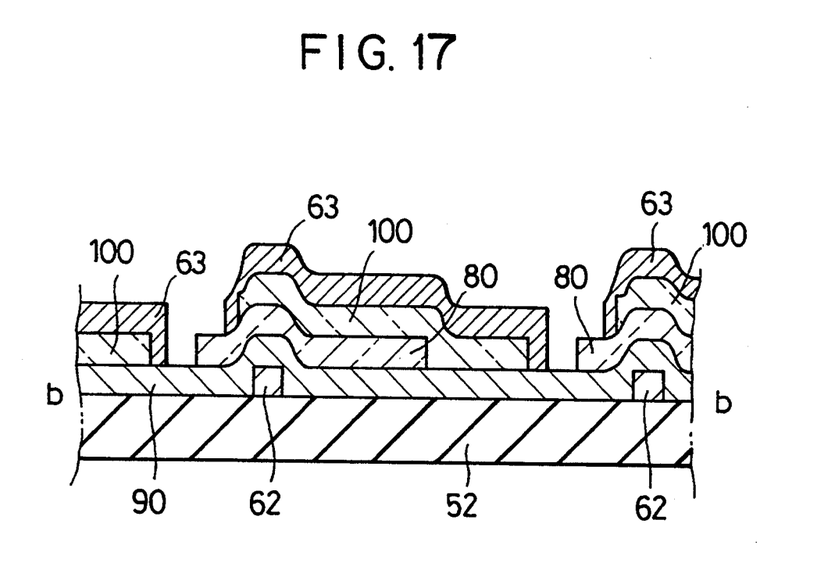
FIG. 17 is a section taken along the line b—b' of FIG. 15.

A sixth embodiment of the present invention will be described below. In this embodiment, a transparent electrode 100 is formed in the portion of the window 63a of the pixel electrode 63 so as to enable a voltage to be applied to the portion of the PDLC 70 corresponding to the portion of the window 63a. FIG. 15 is an enlarged view of the pixel portion of the sixth embodiment. FIGS. 16 and 17 are respectively cross-sections taken along the lines a—a' and b—b'. Identical reference numerals in these figures to those in FIGS. 8 and 9 represent similar or identical elements. The sixth embodiment differs from the fifth embodiment as follows: in the pixel portion formed in this embodiment on the lower substrate 52, the transparent electrode 100 is also formed between the insulating film 90 and the pixel electrode 63 which are formed on the lower substrate 52. In this way, the same voltage as that applied to the pixel electrode 63 is applied to the portion of the PDLC 70 which is located above the window of the pixel electrode 63. As a result, even when the area of the window of the pixel electrode 63 is relatively large, the brightness displayed by the pixel has the rapid threshold characteristics, as in the case of the fourth embodiment.

In the fourth through sixth embodiments, the PDLC 70 in which a dichroic pigment is mixed into the liquid crystal is employed. However, a scattering type PDLC, smectic a liquid crystal, or a nematic liquid crystal in which a dichroic pigment is mixed may also be used.

In addition, amorphous silicon may be used for the photo-conductive element 90. Silicon oxide SiO2 may be used for the insulating film 80. Aluminum whose surface is processed such that it scatters light may be used for the pixel electrode 63. Indium tin oxide (ITO) may be used for the transparent electrode 100.

According to the fourth through sixth embodiments, the reflection type liquid crystal display apparatus includes a transparent upper substrate having transparent signal electrodes, a lower electrode having scanning electrodes and pixel electrodes each connected to the corresponding scanning electrode through a photo-conductive element via an an elongated window provided on the photo-conductive element, the pixel electrode having a surface serving as a reflection surface, and a PDLC filled between the two substrates which are disposed such that the signal electrodes and the pixel electrodes face each other. During the application of a voltage between the signal electrode and the scanning electrode, when the voltage applied to the liquid crystal by the scanning electrode and the pixel electrode reaches a value which ensures that the liquid crystal passes light therethrough, a reduction in the resistance of the photo-conductive element which is illuminated by the light, an increase in the voltage applied to the liquid crystal, an increase in the transparency of the liquid crystal and an increase in the amount of light which passes through the liquid crystal occurs in a positive feedback fashion, and the pixel rapidly brightens. When a voltage, is not applied phenomena occur which are reverse to those which occur when voltage is applied, and the pixel rapidly darkens. Thus, the pixel has rapid threshold characteristics. Furthermore, since the photo-conductive element is illuminated with light through the elongated window, the capacitance of the photoconductive element can be ignored. Therefore, both the threshold characteristics and the small capacitance of the photo-conductive element in combination provide a reflection type liquid crystal display apparatus which is capable of simple matrix high time sharing drive at a normal frequency required to drive the liquid crystal panel. In addition, since a polarizing film is not used in order to eliminate a reduction in the efficiency with which the light is utilized, it is possible to provide a reflection type liquid crystal display apparatus capable of bright display.

In the present invention, since no polarizing film is used in order to eliminate reduction in the efficiency with which projected light is utilized, and since display is performed by utilizing the scattering mode or absorption mode of the polymer dispersed liquid crystal, a bright display can be obtained as compared with the conventional reflection type liquid crystal display apparatus.

What is claimed is:

1. A reflection type liquid crystal display apparatus having pixels disposed in the form of a matrix, said apparatus comprising:

a transparent upper substrate on which a transparent belt-like signal electrode is formed in a direction of the row of the matrix;

a lower substrate having, on a surface thereof which opposes the surface of said upper substrate on which said signal electrode is formed, a belt-like scanning electrode formed in a direction of the column of the matrix, an elongated photo-conductive element connected to said scanning electrode and formed at a position corresponding to each of said pixels, and a pixel electrode having an elongated window above said photo-conductive element and formed such that it covers said photoconductive element, said pixel electrode having a surface serving as a reflection surface; and a liquid crystal filled between said upper and lower substrates.

2. A reflection type liquid crystal display apparatus according to claim 1, wherein said liquid crystal comprises a polymer dispersed liquid crystal in which liquid crystal droplets in which a dichroic pigment is mixed are dispersed in a polymer matrix.

3. A reflection type liquid crystal display apparatus according to claim 1, further comprising a transparent electrode which is provided on the elongated window portion provided in said pixel electrode.

4. A reflection type liquid crystal display apparatus according to claim 1, wherein said photo-conductive element is made of amorphous silicon.

5. A reflection type liquid crystal display apparatus according to claim 1, wherein said pixel electrode is made of aluminum.

6. A reflection type liquid crystal display apparatus having pixels disposed in the form of a matrix, said apparatus comprising:

a transparent upper substrate on which a transparent belt-like signal electrode is formed in a direction of the row of the matrix;

a lower substrate having, on a surface thereof which opposes the surface of said upper substrate on which said signal electrode is formed, a belt-like scanning electrode formed in a direction of the column of the matrix, an elongated photo-conductive element connected to said scanning electrode and formed at a position corresponding to each of said pixels in the form of a plane, and a pixel electrode formed on said photo-conductive element with an elongated window therein, said pixel electrode having a surface serving as a reflection surface; and a liquid crystal filled between said upper and lower substrates.

7. A reflection type liquid crystal display apparatus according to claim 6, wherein said liquid crystal comprises a polymer dispersed liquid crystal in which liquid crystal droplets in which a dichroic pigment is mixed are dispersed in a polymer matrix.

8. A reflection type liquid crystal display apparatus according to claim 6, further comprising a transparent electrode which is provided in the elongated window portion provided in said pixel electrode.

9. A reflection type liquid crystal display apparatus according to claim 8, wherein said liquid crystal comprises a polymer dispersed liquid crystal in which liquid crystal droplets in which a dichroic pigment is mixed are dispersed in a polymer matrix.

* * * * *